(12) United States Patent
Uenosono et al.

(10) Patent No.: US 6,918,945 B2
(45) Date of Patent: Jul. 19, 2005

(54) METHOD FOR PRODUCING SPONGE IRON, AND REDUCED IRON POWDER AND METHOD FOR PRODUCTION THEREOF

(75) Inventors: Satoshi Uenosono, Chiba (JP); Akio Sonobe, Chiba (JP); Hiroshi Sugihara, Chiba (JP)

(73) Assignee: JFE Steel Corporation (JP)

(*) Notice: Subject to any disclaimer, the term of this patent is extended or adjusted under 35 U.S.C. 154(b) by 0 days.

(21) Appl. No.: 10/257,187

(22) PCT Filed: Feb. 13, 2002

(86) PCT No.: PCT/JP02/01175
§ 371 (c)(1),
(2), (4) Date: Oct. 9, 2002

(87) PCT Pub. No.: WO02/064844
PCT Pub. Date: Aug. 22, 2002

(65) Prior Publication Data
US 2003/0110889 A1 Jun. 19, 2003

(30) Foreign Application Priority Data
Feb. 14, 2001 (JP) .......................... 2001-36676
Jul. 9, 2001 (JP) .......................... 2001-207571
Sep. 26, 2001 (JP) .......................... 2001-294845

(51) Int. Cl.$^7$ .......................................... C21B 13/00
(52) U.S. Cl. ..................... 75/359; 75/369; 75/436; 75/471
(58) Field of Search .................. 75/348, 359, 369, 75/436, 471

(56) References Cited

U.S. PATENT DOCUMENTS

| 4,334,920 | A | * | 6/1982 | Mori et al. ............... 75/449 |
| 5,277,368 | A | * | 1/1994 | Kindig ..................... 241/20 |
| 5,750,045 | A | * | 5/1998 | Nihira et al. ........... 252/62.56 |
| 5,972,066 | A | * | 10/1999 | Lehtinen ................. 75/10.63 |
| 6,048,382 | A | * | 4/2000 | Greenwalt ............... 75/436 |
| 6,302,952 | B1 | * | 10/2001 | Mobbs et al. ........... 106/456 |

FOREIGN PATENT DOCUMENTS

JP   6-279824   10/1994

* cited by examiner

Primary Examiner—George Wyszomierski
(74) Attorney, Agent, or Firm—DLA Piper Rudnick Gray Cary US LLP

(57) ABSTRACT

A method for manufacturing sponge iron includes heating iron oxide together with a solid reducing agent to reduce the iron oxide into sponge iron, wherein the iron oxide includes a mixture of powdered hematite and powdered iron ore or a mixture of powdered hematite and powdered mill scale, the powdered hematite has a specific surface area of 2.0 m$^2$/g or more, and the content of the powdered hematite is 5–45% by mass with respect to the total quantity of iron oxide.

21 Claims, 2 Drawing Sheets

METHOD FOR PRODUCING SPONGE IRON, AND REDUCED IRON POWDER AND METHOD FOR PRODUCTION THEREOF

TECHNICAL FIELD

The present invention relates to sponge iron, reduced iron powder, and methods for manufacturing sponge iron and reduced iron powder. The present invention particularly relates to reduced iron powder having a low apparent density and a method for manufacturing the same, and relates to a method for manufacturing sponge iron, which is a raw material of the reduced iron powder, wherein the reduced iron powder is suitable for use in powder metallurgy and is suitable for raw materials for chemical reactions in portable body warmers.

BACKGROUND ART

Conventionally, sponge iron used for manufacturing iron powder for powder metallurgy or chemical reactions has been manufactured by the following procedure: as shown in FIG. 1, a cylindrical body in which iron oxide 2 is placed between beds comprising a solid reducing agent 3 is packed into a cylindrical heat resistant container 1, called a saggar, and the resulting heat resistant container 1 is heated in a tunnel furnace to reduce the iron oxide 2. The sponge iron contains 90–97% by weight of Fe and is roughly crushed into a crude reduced iron powder including particles that can pass through a 90-mesh sieve, and the resulting crude reduced iron powder is provided for chemical reactions. For use in powder metallurgy, the crude reduced iron powder is reduced again in a non-oxidizing atmosphere such as hydrogen gas to finally produce a high-purity reduced iron powder containing at least 99.5% by weight of Fe. Generally, the iron oxide 2 includes iron ore and mill scale, and the solid reducing agent 3 includes a mixture of lime powder and carbonaceous powder such as coke powder. The process for manufacturing sponge iron and reduced iron powder is shown in FIG. 2.

Generally, reduced iron powder that is manufactured by crushing sponge iron or then reducing the crushed sponge iron consists of particles that are irregular shape and porous, so that the reduced iron powder has excellent compactability and sintering properties. Therefore, the reduced iron powder is suitable for raw materials for powder metallurgy and is used together with an atomized iron powder. The reduced iron is porous, has a specific surface area larger than that of the atomized iron powder, and readily reacts with oxygen. Therefore, the reduced iron powder is suitable for a wide range of applications, for example, chemically reactive materials such as deoxidizing agents and raw materials for portable body warmers.

Reduced iron powder that is manufactured by crushing sponge iron manufactured by reducing mill scale and then reducing the crushed sponge iron generally has high purity. However, there is a problem in that the reduced iron powder has an apparent density of 2.40–2.80 Mg/m³, which is relatively large, and has poor compactability.

Reduced iron powder that is manufactured by crushing sponge iron manufactured by reducing iron ore and then further reducing the crushed sponge iron has an apparent density of 1.70–2.50 Mg/m³, which is relatively small, and is used for porous bearing metal. However, there is a problem in that the reduced iron powder has a small compressibility. The iron oxide content in iron ore is small and iron ore usually contains gangue components such as $SiO_2$ and $Al_2O_3$, wherein the $SiO_2$ content is about 1–2% by mass and the $Al_2O_3$ content is about 0.2–1% by mass. Therefore, there is a risk that $SiO_2$ and $Al_2O_3$ remaining in the reduced iron powder as inclusions causes the performance of the bearings to decrease.

In order to solve the above problems, a method for manufacturing reduced iron powder for powder metallurgy is disclosed in Japanese Unexamined Patent Application Publication No. 53-26710 as follows: a raw material including a mixture of powdered mill scale and 5–40% by mass of iron ore are roughly reduced into sponge iron, and the resulting sponge iron is crushed to remove impurities, is finally reduced, and is then crushed again into a reduced iron powder having an apparent density of 2.0–2.6 Mg/m³, wherein the reduced iron powder has excellent compactability and compressibility.

The reduced iron powder manufactured by the method disclosed in Japanese Unexamined Patent Application Publication No. 53-26710 has a small apparent density. However, there is a problem in that the purity is still low due to the use of iron ore, that is, inclusions remain in the reduced iron powder.

DISCLOSURE OF INVENTION

In order to solve the above problems of the conventional methods, it is an object of the present invention to provide a method for manufacturing sponge iron used for manufacturing reduced iron powder having higher purity and lower apparent density than those of iron powder made from iron ore, and to provide reduced iron powder and a method for manufacturing the same.

As used herein, iron powder having "a low apparent density" is defined as one having an apparent density of 2.40 Mg/m³ or less. The apparent density used herein is determined based on the JPMA P06-1992 standard of the JAPAN POWDER METALLURGY ASSOCIATION.

The reaction of forming sponge iron consists of elemental reactions expressed by the following formulas (1) to (3):

$$CaCO_3 \rightarrow CaO + CO_2 \qquad (1)$$

$$CO_2 + C \rightarrow 2CO \qquad (2)$$

$$FeO + CO \rightarrow Fe + CO_2 \qquad (3)$$

When heated, lime ($CaCO_3$) in a solid reducing agent is decomposed to produce $CO_2$ as expressed by formula (1). The resulting $CO_2$ reacts with carbon (C) in the solid reducing agent to produce CO, according to the Boudouard Reaction expressed by formula (2). The resulting CO is diffused into an iron oxide bed to reduce iron oxide (FeO) into sponge iron (Fe) according to formula (3). $CO_2$ formed in the last reaction is diffused from the iron oxide bed to solid reducing agent bed to cause the Boudoir reaction expressed by formula (2) again to produce CO. The resulting CO is diffused into an iron oxide bed again to reduce iron oxide (FeO) into sponge iron (Fe). During the reduction reaction of iron oxide, the sintering of the sponge iron proceeds.

Since the production of sponge iron having a low apparent density is regarded as key in order to achieve the above object, the inventors have studied the formation reaction of the sponge iron. As a result, the inventors have assumed that the following technique is effective: the sintering of formed sponge iron is suppressed to form many pores in the sponge iron. The inventors have further conducted intensive research based on the above concept, and have found that the following method is effective in suppressing the sintering reaction of the formed sponge iron: fine hematite powder is mixed into iron ore powder or mill scale powder to form a mixture and the mixture is then reduced into sponge iron.

The present invention has been completed as a result of further study based on the above finding.

The present invention provides a method for manufacturing sponge iron by heating iron oxide together with a solid reducing agent to reduce the iron oxide into sponge iron, wherein the iron oxide includes a mixture of powdered hematite and powdered iron ore or a mixture of powdered hematite and powdered mill scale, the powdered hematite has a specific surface area of 2.0 m$^2$/g or more, and the content of the powdered hematite is 5–45% by mass in the total quantity of the iron oxide. In the method of the present invention, the powdered iron ore preferably includes particles having an average diameter of 30 μm to 1 mm. Furthermore, in the method, the powdered mill scale preferably includes particles having an average diameter of 30 μm to 1 mm. Furthermore, in the method, the powdered hematite is preferably obtained by heating an aqueous iron chloride solution in an oxidizing atmosphere. Furthermore, in the method, the iron oxide preferably includes a mixture of powdered mill scale, powdered iron ore, and powdered hematite.

The present invention further provides a method for manufacturing reduced iron powder comprising crushing sponge iron manufactured by any one of the above methods. The method of the present invention further comprises reducing the reduced iron powder in a reducing atmosphere.

Figure 1:
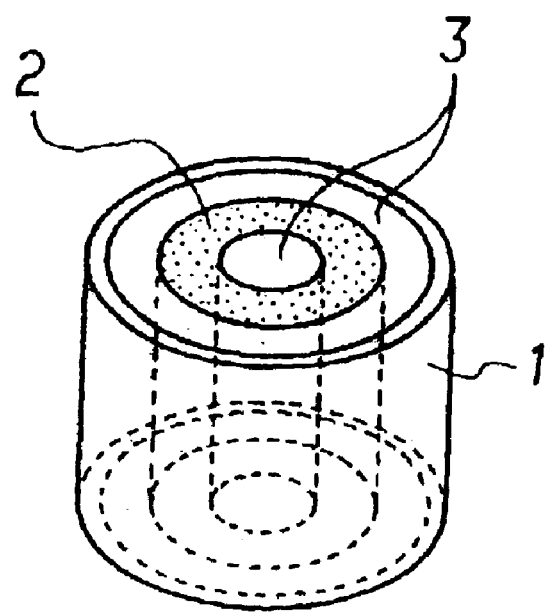
FIG. 1 is an illustration showing an example method for packing carbonaceous powder, lime powder, and iron oxide into a cylindrical heat resistant container.
Figure 2:
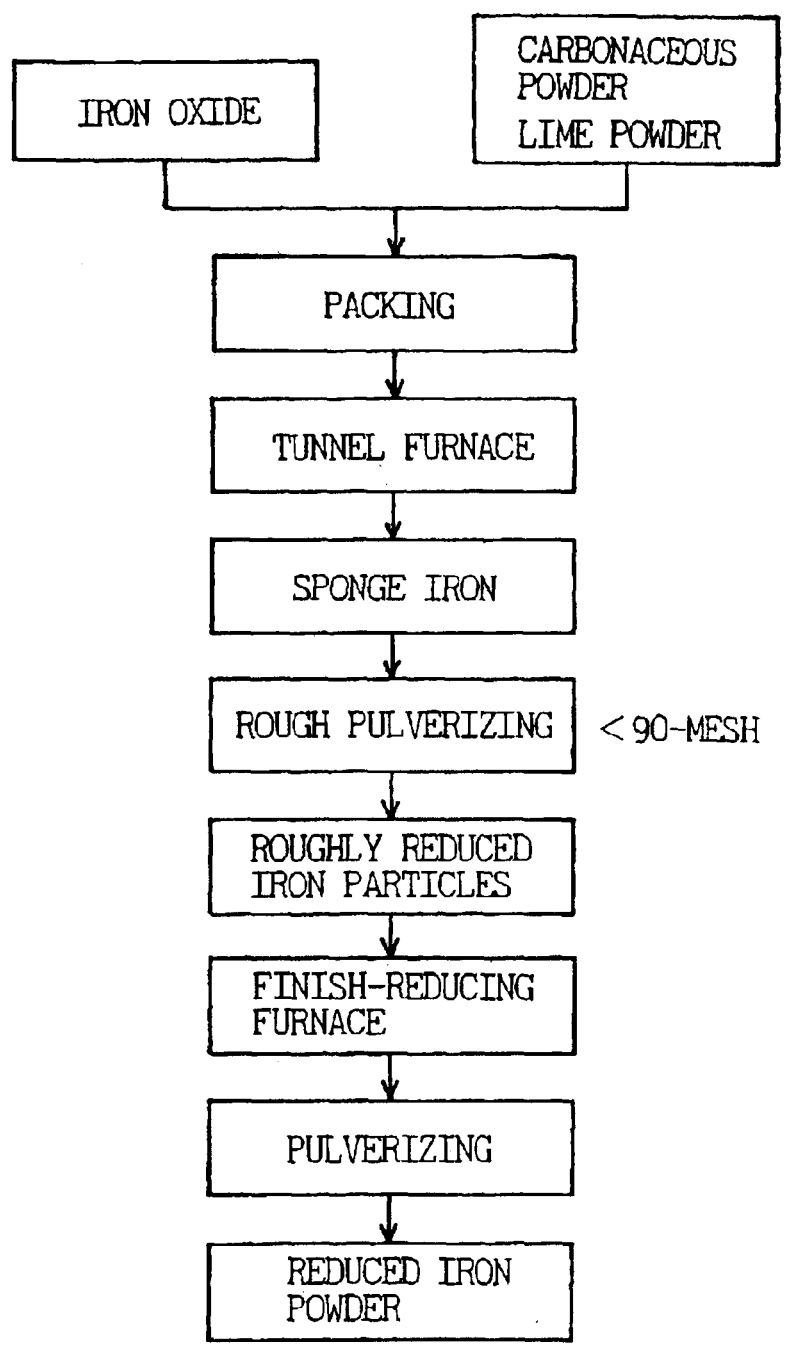
FIG. 2 is an illustration showing an example process for manufacturing sponge iron and reduced iron powder.

REFERENCE NUMERALS 1 heat resistant container
2 iron oxide
3 solid reducing agent

BEST MODE FOR CARRYING OUT THE INVENTION

A method for manufacturing sponge iron and a method for manufacturing reduced iron powder according to the present invention will now be described.

In the present invention, iron oxide and a solid reducing agent are packed into a heat resistant container. For example, as shown in FIG. 1, in a cylindrical heat resistant container 1, which is called a saggar and comprises SiC, a bed of iron oxide 2 is preferably sandwiched between two beds of solid reducing agent 3.

In the present invention, the iron oxide 2 includes a mixture of iron ore powder and hematite powder or a mixture of mill scale powder and hematite powder.

The iron oxide 2 may include a mixture of mill scale powder, iron ore powder, and hematite powder.

The iron ore powder is preferably magnetitic or hematitic. The iron ore powder preferably has particles having an average diameter of 30 μm to 1 mm. When the average particle diameter exceeds 1 mm, the production rate in the sponge iron-crushing step is seriously decreased. In contrast, the production rate in the sponge iron-crushing step is increased when the average particle diameter is small. However, it is not practical to produce an iron ore powder having an average particle diameter of less than 30 μm because the cost of crushing iron ore is very high.

The mill scale powder is preferably one generated in a hot-rolling step. The mill scale powder preferably has particles having an average diameter of 30 μm to 1 mm. When the average particle diameter exceeds 1 mm, the production rate in the sponge iron-crushing step is seriously decreased. In contrast, the production rate in the sponge iron-crushing step is increased when the average particle diameter is small. However, it is not practical to produce mill scale powder having an average particle diameter of less than 30 μm because the cost of crushing mill scale is very high.

As used herein, the term "average particle diameter" is defined as a particle diameter with a cumulative frequency of 50% on a mass basis, wherein the diameter is measured by a sieve method (the JPMA P02-1992 standard of the JAPAN POWDER METALLURGY ASSOCIATION).

In the present invention, iron oxide powder includes the iron ore powder or the mill scale powder and further includes the hematite powder. The hematite powder has fine particles having a specific surface area of 2 m$^2$/g or more. That is, when the iron oxide powder including the iron ore powder or the mill scale powder further includes fine hematite powder, the reduced iron powder of the final product has a small apparent density. The mechanism is believed to be as follows.

The fine hematite particles are situated among the iron ore particles and the mill scale particles to prevent reduced iron particles (reduced iron particles formed from the iron ore particles or formed from the mill scale particles) from sintering, wherein the iron ore particles and the mill scale particles are reduced into the reduced iron particles. Since the iron ore particles or the mill scale particles are in contact with the hematite particles, the reduced iron particles formed from the iron ore particles or formed from the mill scale particles are readily sintered with other reduced iron particles formed from the hematite particles. Sponge iron having cavities is formed because the reduced iron particles formed from the iron ore particles or formed from the mill scale particles are prevented from sintering, and the cavities remain after the sponge iron is processed in a roughly crushing step, a reducing step, and a crushing step into reduced iron powder. Therefore, the reduced iron powder has a small apparent density.

When the hematite particles have a specific surface area of less than 2.0 m$^2$/g, that is, the hematite particles are coarse, the reduced iron particles formed from the iron ore particles or formed from the mill scale particles are not effectively prevented from sintering. Therefore, the reduced iron powder does not have a sufficiently small apparent density. When the hematite particles have a specific surface area of more than 10 m$^2$/g, the handling is difficult. Therefore, the hematite iron powder preferably has a specific surface area of 10 m$^2$/g or less. As used herein, "the specific surface area" of the powder is a value determined by the BET method using nitrogen as an adsorption gas.

The content of the hematite powder in the iron oxide 2 is 5–45% by mass with respect to the total quantity of the iron oxide 2. When the hematite powder content is less than 5% by mass, the reduced iron powder has a large apparent density. In contrast, when the hematite powder content exceeds 45% by mass, the production rate of the sponge iron is decreased due to the slow reduction rate. Therefore, the hematite powder content is 5–45% by mass with respect to the total quantity of the iron oxide 2.

In the present invention, the hematite powder in the iron oxide 2 is different from the hematitic iron ore. The hematite powder is preferably prepared by heating an aqueous iron chloride solution in an oxidizing atmosphere. Hematite powder prepared by heating an aqueous iron chloride solution in an oxidizing atmosphere is commercially available and the commercial hematite powder can be used without treatment. The commercial hematite powder including, for example, iron oxide KH-DS and iron oxide KH-DC manufactured by Kawasaki Steel Corporation has a specific surface area of 2–5 m$^2$/g, a SiO$_2$ content of 300 ppm by mass or less, and an Al$_2$O$_3$ content of 30 ppm by mass or less, which are very small, wherein SiO$_2$ and Al$_2$O$_3$ are the inclusions causing problems. Therefore, such hematite powder is suitable for use in the embodiment of the present invention.

In the present invention, the iron oxide 2 including the iron ore powder or the mill scale powder and the hematite powder may further include magnetite powder.

On the other hand, the solid reducing agent 3 preferably includes a mixture of lime powder (CaCO$_3$) and carbonaceous powder (C).

Since the lime powder having a small average particle diameter is decomposed in a short time to produce CO$_2$ gas effectively, the Boudouard Reaction expressed by formula (2) is accelerated. Therefore, such lime powder is advantageous in accelerating a reductive reaction. The lime powder content is preferably 5–30% by mass with respect to the total quantity of the solid reducing agent 3 (the total quantity of the lime powder and the carbonaceous powder).

The carbonaceous powder preferably includes coke, coal, or smokeless coal powder. These can be used in combination. The carbonaceous powder having a small average particle diameter is effective in accelerating the reductive reaction. Therefore, the carbonaceous powder preferably has an average particle diameter of 10 mm or less. The content of the carbonaceous powder is preferably 70–95% by mass with respect to the total quantity of the solid reducing agent 3 (the total quantity of the lime powder and the carbonaceous powder).

As described above, the heat resistant container 1 containing the iron oxide 2 (a mixture of the iron ore powder or the mill scale powder and the hematite powder) and the solid reducing agent 3 is then introduced into a furnace such as a tunnel furnace to be heated. The heating temperature is preferably 1000° C. to 1300° C. When heated, the reductive reaction proceeds, that is, the iron oxide 2 is reduced by the solid reducing agent 3, to produce sponge iron.

When the heating temperature is less than 1000° C., the purity of the produced sponge iron is low due to the insufficient progress of the reductive reaction of the iron oxide. In contrast, when the heating temperature exceeds 1300° C., the sintering of the sponge iron, which occurs simultaneously together with the reductive reaction, proceeds excessively to cause the production cost to increase due to the following factors: an increase in electrical consumption in a succeeding crushing step and a high incidence of damaged crushing tools. Therefore, the heating temperature is preferably 1000–1300° C., and more preferably 1050–1200° C.

After heating, the sponge iron and the solid reducing agent 3 are separately drawn out from the heat resistant container 1. The resulting sponge iron is roughly crushed into a crude reduced iron powder having particles that can pass through a 90-mesh sieve. The crude reduced iron powder can mainly be used for chemical reactive agents.

The crude reduced iron powder is then reduced again in a reducing atmosphere in a finish-reducing furnace and is crushed again into a reduced iron powder, that is, a product. The reduced iron powder can mainly be used in powder metallurgy.

According to the method of the present invention, a reduced iron powder having a small apparent density can be readily manufactured. As described below, when the reduced iron powder having a small apparent density is sintered, a porous sintered body is crushed, thereby obtaining a sintered component having a large capacity to retain oil. When such reduced iron powder is used for chemical reactions, the efficiency in the chemical reactions is increased because the reduced iron powder includes particles having a large specific surface area.

EXAMPLE

Example 1

As shown in FIG. 1, 250 kg of iron oxide (powder mixture of an iron ore powder and a hematite powder), which is a main raw material, and 190 kg of a solid reducing agent, which is an auxiliary raw material, were packed into a cylindrical saggar (heat resistant container 1 comprising SiC) having a diameter of 400 mm and a height of 1800 mm, wherein the bed of the iron oxide 2 is sandwiched between the two beds of the solid reducing agent 3.

Table 1 shows the composition of each powder used for the main raw material.

The iron ore powder, the mill scale powder, and the hematite powder having the composition shown in Table 1 were mixed with the mixing ratios shown in Table 2 to prepare mixed powders for the main raw material.

The iron ore powder was prepared by drying MBR-PF, which is readily available for use in steel manufacture. The following hematite powders were used: commercially available hematite powders (iron oxide powders manufactured by Kawasaki Steel Corporation: Type "KH-DS" and Type "KH-DC") prepared by heating an aqueous iron chloride solution in an oxidizing atmosphere. The specific surface area of the hematite powders was determined by the BET method using nitrogen as an adsorption gas. In some samples, hematite crude powders (a specific surface area of 0.5 m$^2$/g) that were prepared by the following procedure were used: the above hematite powders were fired at 800° C. and were then crushed. In other samples, the main raw material included a powder prepared by drying mill scale produced in a hot rolling step and by crushing the resulting mill scale.

The solid reducing agent 3, which is an auxiliary raw material, included a mixture of lime powder and carbonaceous powder whose contents are shown in Table 2. The lime powder had an average particle diameter of 80 μm and the carbonaceous powder included coke powder and smokeless coal powder. The coke powder had an average particle diameter of 85 μm and the smokeless coal powder had an average particle diameter of 2.4 mm. The powders were weighed and were then mixed to prepare the auxiliary raw material having the composition shown in Table 2.

As shown in FIG. 1, the heat resistant container 1 (saggar) packed with the main raw material and the auxiliary raw material was introduced into a furnace (not shown), was covered with a saggar lid comprising SiC, and was heated up to a temperature shown in Table 2 to prepare sponge iron. The heating time was 20 hr and the retention time was 44 hr. After the retention time elapsed, the heat resistant container 1 was cooled.

The obtained sponge iron was roughly crushed into a crude reduced iron powder including particles that can pass through a 90-mesh sieve. The crude reduced iron powder was reduced at 900° C. for 1 hr in a hydrogen atmosphere having a dew point of 40° C. and was then crushed again into a reduced iron powder.

For each obtained reduced iron powder, the $SiO_2$ content, the $Al_2O_3$ content, and the oxygen content were measured by chemical analysis. The apparent density was also measured based on the JPMA P06-1992 standard of the JAPAN POWDER METALLURGY ASSOCIATION. These results are shown in Table 2.

The examples of the present invention have an apparent density of 1.55–1.85 $Mg/m^3$, which is smaller than those of the conventional examples. In contrast, the conventional examples (samples 10 and 11) and a comparative example (sample 12) have a higher apparent density, wherein the conventional examples include no hematite powder and the comparative example includes a hematite powder including particles having a specific surface area that is out of the range of the present invention.

Example 2

As shown in FIG. 1, 250 kg of iron oxide (powder mixture of a mill scale powder and a hematite powder), which is a main raw material, and 190 kg of a solid reducing agent, which is an auxiliary raw material, were packed into a cylindrical saggar (heat resistant container 1 comprising SiC) having a diameter of 400 mm and a height of 1800 mm, wherein the bed of the iron oxide 2 was sandwiched between the two beds of the solid reducing agent 3.

Table 1 shows the composition of each powder used for the main raw material.

The iron ore powder, the mill scale powder, and the hematite powder were mixed with the mixing ratios shown in Table 3 to prepare mixed powders for the main raw material.

The mill scale powder was prepared by drying mill scale generated in a hot rolling step and by crushing the dried scale. The following hematite powders were used: commercially available hematite powders (iron oxide powders manufactured by Kawasaki Steel Corporation: Type "KH-DS" and Type "KH-DC") prepared by heating an aqueous iron chloride solution in an oxidizing atmosphere. The specific surface area of the hematite powders was determined by the BET method using nitrogen as an adsorption gas. In some samples, hematite crude powders (a specific surface area of 0.5 $m^2/g$) that were prepared by the following procedure were used: the above hematite powders were fired at 800° C. and was then crushed. In other samples, the main raw material included an iron ore powder having the composition shown in Table 1.

The solid reducing agent 3, which is an auxiliary raw material, included a mixture of lime powder and carbonaceous powder whose contents are shown in Table 2. The lime powder had an average particle diameter of 80 $\mu m$ and the carbonaceous powder included coke powder and/or smokeless coal powder. The coke powder had an average particle diameter of 85 $\mu m$ and the smokeless coal powder had an average particle diameter of 2.4 mm. The powders were weighed and were then mixed to prepare the auxiliary raw material having the composition shown in Table 2.

As shown in FIG. 1, the heat resistant container 1 (saggar) packed with the main raw material and the auxiliary raw material was introduced into a furnace (reducing furnace), was covered with a saggar lid comprising SiC, and was heated up to a temperature shown in Table 3 to prepare sponge iron. The heating time was 20 hr and the retention time was 44 hr. After the retention time elapsed, the heat resistant container 1 was cooled.

The obtained sponge iron was roughly pulverized into a crude reduced iron powder including particles that can pass through a 90-mesh sieve. The crude reduced iron powder was treated in a final reduction step at 900° C. for 1 hr in a hydrogen atmosphere having a dew point of 40° C. and was then pulverized again into reduced iron powder.

For each obtained reduced iron powder, the $SiO_2$ content, the $Al_2O_3$ content, and the oxygen content were measured by chemical analysis. The apparent density was also measured based on the JPMA P06–1992 standard of the JAPAN POWDER METALLURGY ASSOCIATION. These results are shown in Table 3.

The examples of the present invention have an apparent density of 2.0–2.4 $Mg/m^3$, which is smaller than those of the conventional examples (samples 20 and 21). All the examples have a smaller $SiO_2$ content and a smaller $Al_2O_3$ content than those of a conventional example (sample 21), that is, the examples have high purity.

On the other hand, in another conventional example (sample 22) including a hematite powder having a specific surface area below the range of the present invention, the reduced iron powder has an apparent density of 2.57 $Mg/m^3$, which is high. A comparative example (sample 23) has a large oxygen content because the reduction is not sufficient due to the slow rate of the reductive reaction, wherein the comparative example contains the hematite powder at a content exceeding the range of the present invention.

TABLE 1

| Main Raw Material | | Content (mass %) | | |
|---|---|---|---|---|
| | | Total Fe | $SiO_2$ | $Al_2O_3$ |
| Mill Scale Powder | | 75.0 | 0.05 | 0.04 |
| Hematite | Type A | 66.5 | 0.012 | 0.005 |
| Powder | Type B | 67.0 | 0.02 | 0.004 |
| Iron Powder | | 71.0 | 1.5 | 0.6 |

Hematite Powder, Type A: Iron Oxide manufactured by Kawasaki Steel Corporation; Type KH-DS
Hematite Powder, Type B: Iron Oxide manufactured by Kawasaki Steel Corporation; Type KH-DC

TABLE 2

| | Main Raw Material (Mixed Powder) | | | | | Auxiliary Raw Material | | | Reduction for Manufacturing Sponge Iron |
|---|---|---|---|---|---|---|---|---|---|
| | Iron Ore Powder | | Hematite Powder | | | Lime Powder | Carbonaceous Powder | | |
| | | | | | | | Coke | Smokeless Coal | |
| Samples | Average Diameter (μm) | Content * (mass %) | Type *** | Specific Surface Area (m²/g) | Content * (mass %) | Content ** (mass %) | Content ** (mass %) | Content ** (mass %) | Heating Temperature (° C.) |
| 1 | 120 | 93 | A | 2.3 | 7 | 10 | 90 | — | 1050 |
| 2 | 120 | 90 | B | 2.6 | 10 | 15 | 70 | 15 | 1100 |
| 3 | 120 | 85 | A | 2.3 | 15 | 17 | 63 | 20 | 1150 |
| 4 | 120 | 80 | B | 2.6 | 20 | 20 | 40 | 40 | 1050 |
| 5 | 120 | 75 | B | 2.6 | 25 | 15 | 75 | 10 | 1100 |
| 6 | 120 | 70 | A | 2.3 | 30 | 16 | 79 | 5 | 1150 |
| 7 | 120 | 65 | B | 2.6 | 35 | 12 | 73 | 15 | 1050 |
| 8 | 120 | 76 | D | 4.3 | 24 | 18 | 62 | 20 | 1050 |
| 9 | 120 | 81 | D | 7.5 | 19 | 21 | 59 | 20 | 1050 |
| 10 | 120 | 100 | — | — | — | 15 | 75 | 10 | 1100 |
| 11 | — | — | | **** | | 15 | 75 | 10 | 1100 |
| 12 | 120 | 90 | C | 0.5 | 10 | 15 | 70 | 15 | 1100 |

| | | Reduced Iron Powder | | | |
|---|---|---|---|---|---|
| | Apparent Density | Oxygen Content | Type & Purity of Contained Oxide | | |
| Samples | (Mg/m³) | (mass %) | SiO₂ (mass %) | Al₂O₃ (mass %) | Remarks |
| 1 | 1.85 | 0.40 | 2.0 | 0.83 | Examples |
| 2 | 1.80 | 0.35 | 1.9 | 0.81 | |
| 3 | 1.77 | 0.35 | 1.8 | 0.77 | |
| 4 | 1.73 | 0.38 | 1.7 | 0.73 | |
| 5 | 1.68 | 0.38 | 1.6 | 0.70 | |
| 6 | 1.61 | 0.37 | 1.4 | 0.64 | |
| 7 | 1.55 | 0.37 | 1.3 | 0.58 | |
| 8 | 1.75 | 0.37 | 1.7 | 0.75 | |
| 9 | 1.74 | 0.36 | 1.6 | 0.74 | |
| 10 | 2.05 | 0.41 | 2.1 | 0.86 | Con. |
| 11 | 2.57 | 0.35 | 0.07 | 0.05 | Ex. |
| 12 | 2.01 | 0.38 | 1.9 | 0.81 | C.E. |

\* Mass percentage with respect to the total quantity of powder mixture
\*\* Mass percentage with respect to the total quantity of solid reducing agent
\*\*\* A: Hematite powder (Iron oxide manufactured Kawasaki Steel Corporation; Type KH-DS)
B: Hematite powder (Iron oxide manufactured Kawasaki Steel Corporation; Type KH-DC)
C: Hematite crude powder
D: Hematite powder (Prepared at a laboratory)
\*\*\*\* Mill scale powder (an average particle diameter of 100 μm)
Con. Ex.: Conventional Examples
C.E.: Comparative Example

TABLE 3

| | Main Raw Material (Mixed Powder) | | | | | | | Auxiliary Raw Material | | | Reduction for Manufacturing Sponge Iron |
|---|---|---|---|---|---|---|---|---|---|---|---|
| | Iron Ore Powder | | Mill Scale Powder | | Hematite Powder | | | Lime Powder | Carbonaceous Powder | | |
| | | | | | | | | | Coke | Smokeless Coal | |
| Samples | Ave. Dia. μm | Content * mass % | Ave. Dia. μm | Content * mass % | Type *** | Specific Surface Area m²/g | Content * mass % | Content ** mass % | Content ** mass % | Content ** mass % | Heating Temperature ° C. |
| 13 | — | — | 100 | 93 | A | 2.3 | 7 | 10 | 90 | — | 1050 |
| 14 | — | — | 55 | 90 | B | 2.6 | 10 | 15 | 70 | 15 | 1100 |
| 15 | — | — | 60 | 85 | A | 2.3 | 15 | 17 | 63 | 20 | 1150 |
| 16 | — | — | 190 | 80 | B | 2.6 | 20 | 20 | 40 | 40 | 1050 |
| 17 | — | — | 120 | 75 | B | 2.6 | 25 | 15 | 75 | 10 | 1100 |
| 18 | — | — | 68 | 70 | A | 2.3 | 30 | 16 | 79 | 5 | 1150 |

TABLE 3-continued

| | | | | | | | | | | | | |
|---|---|---|---|---|---|---|---|---|---|---|---|---|
| 19 | — | — | 111 | 65 | B | 2.6 | 35 | 12 | 73 | 15 | | 1050 |
| 20 | — | — | 87 | 100 | — | — | — | 15 | 75 | 10 | | 1100 |
| 21 | 120 | 100 | — | — | — | — | — | 15 | 75 | 10 | | 1100 |
| 22 | — | — | 90 | 90 | C | 0.5 | 10 | 15 | 70 | 15 | | 1100 |
| 23 | — | — | 72 | 40 | A | 2.3 | 60 | 15 | 70 | 15 | | 1100 |

| | | Reduced Iron Powder | | | |
|---|---|---|---|---|---|
| | | | Purity | | |
| Samples | Apparent Density $Mg/m^2$ | Oxygen Content mass % | $SiO_2$ mass % | $Al_2O_3$ mass % | Remarks |
| 13 | 2.33 | 0.26 | 0.08 | 0.05 | Examples |
| 14 | 2.21 | 0.27 | 0.08 | 0.05 | |
| 15 | 2.19 | 0.26 | 0.07 | 0.05 | |
| 16 | 2.10 | 0.25 | 0.07 | 0.04 | |
| 17 | 2.05 | 0.22 | 0.07 | 0.05 | |
| 18 | 2.00 | 0.28 | 0.07 | 0.04 | |
| 19 | 1.95 | 0.26 | 0.06 | 0.05 | |
| 20 | 2.57 | 0.35 | 0.07 | 0.05 | Con. |
| 21 | 1.94 | 0.41 | 2.1 | 0.86 | Ex. |
| 22 | 2.40 | 0.26 | 0.08 | 0.05 | C.E. |
| 23 | 1.55 | 1.03 | 0.03 | 0.03 | |

\* Mass percentage with respect to the total quantity of powder mixture
\*\* Mass percentage with respect to the total quantity of solid reducing agent
\*\*\* A: Hematite powder (Iron oxide manufactured Kawasaki Steel Corporation; Type KH-DS)
B: Hematite powder (Iron oxide manufactured Kawasaki Steel Corporation; Type KH-DC)
C: Hematite crude powder
D: Hematite powder (Prepared at a laboratory)
Con. Ex.: Conventional Examples
C.E.: Comparative Examples

INDUSTRIAL APPLICABILITY

According to the present invention, a method for manufacturing sponge iron having a smaller apparent density than that of a conventional one, reduced iron powder, and a method for manufacturing the same can be provided, thereby achieving superior industrial advantages.

What is claimed is:

1. A method for manufacturing sponge iron comprising:
    forming an iron oxide mixture by mixing fine powdered hematite having a specific surface area of 2.0 $m^2$/g or more and powdered iron ore or a mixture of the fine powdered hematite and powdered mill scale, wherein the content of the fine powdered hematite is 5–45% by mass based on the total quantity of the iron oxide mixture; and
    heating the iron oxide mixture with a solid reducing agent to reduce the iron oxide into sponge iron having an apparent density of 2.4 $Mg/m^3$ or less.

2. The method for manufacturing sponge iron according to claim 1, wherein the powdered iron ore includes particles having an average diameter of 30 $\mu$m to 1 mm.

3. The method for manufacturing sponge iron according to claim 2, wherein the powdered mill scale includes particles having an average diameter of 30 $\mu$m to 1 mm.

4. The method for manufacturing sponge iron according to claim 2, wherein the fine powdered hematite is obtained by heating an aqueous iron chloride solution in an oxidizing atmosphere.

5. The method for manufacturing sponge iron according to claim 2, wherein the iron oxide mixture includes a mixture of powdered mill scale, powdered iron ore, and the fine powdered hematite.

6. A method for manufacturing reduced iron powder comprising crushing sponge iron manufactured by the method according to claim 2.

7. The method for manufacturing sponge iron according to claim 1, wherein the powdered mill scale includes particles having an average diameter of 30 $\mu$m to 1 mm.

8. The method for manufacturing sponge iron according to claim 7, wherein the fine powdered hematite is obtained by heating an aqueous iron chloride solution in an oxidizing atmosphere.

9. The method for manufacturing sponge iron according to claim 7, wherein the iron oxide mixture includes a mixture of powdered mill scale, powdered iron ore, and the fine powdered hematite.

10. A method for manufacturing reduced iron powder comprising crushing sponge iron manufactured by the method according to claim 7.

11. The method for manufacturing sponge iron according to claim 1, wherein the fine powdered hematite is obtained by heating an aqueous iron chloride solution in an oxidizing atmosphere.

12. The method for manufacturing sponge iron according to claim 11, wherein the iron oxide mixture includes a mixture of powdered mill scale, powdered iron ore, and the fine powdered hematite.

13. A method for manufacturing reduced iron powder comprising crushing sponge iron manufactured by the method according to claim 11.

14. The method for manufacturing sponge iron according to claim 1, wherein the iron oxide mixture includes a mixture of powdered mill scale, powdered iron ore, and the fine powdered hematite.

15. A method for manufacturing reduced iron powder comprising crushing sponge iron manufactured by the method according to claim 14.

16. A method for manufacturing reduced iron powder comprising:
    crushing sponge iron manufactured by the method according to claim 14 into crude iron powder, and, further reducing the crude reduced iron powder.

17. A method for manufacturing reduced iron powder comprising crushing sponge iron manufactured by the method according to claim 1.

18. A method for manufacturing reduced iron powder comprising:

crushing sponge iron manufactured by the method according to claim 1 into crude reduced iron powder, and, further reducing the crude reduced iron powder.

19. A method for manufacturing sponge iron comprising:

forming an iron ore mixture by mixing fine powdered hematite having a specific surface area of 2.0 m$^2$/g or more and powdered iron ore or a mixture of powdered hematite and powdered mill scale, wherein the content of the fine powdered hematite is 5–45% by mass based on the total quantity of the iron oxide mixture; and heating the iron oxide mixture with a solid reducing agent to reduce the iron oxide into sponge iron having an apparent density of 2.4 Mg/m$^3$ or less so that fine hematite particles are located among iron ore particles or powdered mill scale particles to prevent sintering between the reduced iron particles.

20. A method for manufacturing reduced iron powder comprising:

forming an iron oxide mixture by mixing fine powdered hematite having a specific surface area of 2.0 m$^2$/g or more and powdered iron ore or a mixture of the fine powdered hematite and powdered mill scale, wherein the content of the fine powdered hematite is 5–45% by mass based on the total quantity of the iron oxide mixture;

heating the iron oxide mixture with a solid reducing agent to reduce the iron oxide into sponge iron; and crushing the sponge iron into crude reduced iron power and further reducing the crude reduced iron powder.

21. A method for manufacturing reduced iron powder comprising:

forming an iron oxide mixture by mixing fine powdered hematite having a specific area of 2.0 m$^2$/g or more, powdered iron ore and powdered mill scale, wherein the content of the fine powdered hematite is 5–45% by mass based on the total quantity of the iron oxide mixture; and heating the iron oxide mixture with a solid reducing agent to reduce the iron oxide into sponge iron; and crushing the sponge iron into crude powder and further reducing the crude reduced iron powder.

* * * * *